US011962960B2

(12) United States Patent

Lee et al.

(10) Patent No.: US 11,962,960 B2
(45) Date of Patent: Apr. 16, 2024

(54) ELECTRONIC DEVICE INCLUDING SOUND COMPONENT ASSEMBLY

(71) Applicant: SAMSUNG ELECTRONICS CO., LTD., Suwon-si (KR)

(72) Inventors: Hyungwoo Lee, Suwon-si (KR); Jongchun Wee, Suwon-si (KR); Byounguk Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/888,889

(22) Filed: Aug. 16, 2022

(65) Prior Publication Data

US 2023/0012838 A1 Jan. 19, 2023

Related U.S. Application Data

(63) Continuation of application No. PCT/KR2022/008296, filed on Jun. 13, 2022.

(30) Foreign Application Priority Data

Jul. 19, 2021 (KR) ........................ 10-2021-0094271

(51) Int. Cl.

*H04R 1/02* (2006.01)
*H04R 1/04* (2006.01)
*H04R 1/08* (2006.01)
*H04R 3/00* (2006.01)

(52) U.S. Cl.

CPC ............. *H04R 1/023* (2013.01); *H04R 1/025* (2013.01); *H04R 1/04* (2013.01); *H04R 1/086* (2013.01); *H04R 3/00* (2013.01); *H04R 2201/029* (2013.01); *H04R 2400/11* (2013.01); *H04R 2499/11* (2013.01)

(58) Field of Classification Search

CPC .......... H04R 1/023; H04R 1/025; H04R 1/04; H04R 1/086; H04R 3/00; H04R 2201/029; H04R 2400/11; H04R 2499/11

See application file for complete search history.

(56) References Cited

U.S. PATENT DOCUMENTS

| | | | | |
|---|---|---|---|---|
| 8,804,993 B2 | 8/2014 | Shukla et al. | | |
| 9,210,492 B2 | 12/2015 | Dave et al. | | |
| 11,696,057 B2 * | 7/2023 | Xiao | H04R 1/023 | 381/334 |
| 2003/0133585 A1 * | 7/2003 | Cheung | H04R 1/1075 | 381/370 |
| 2007/0189568 A1 * | 8/2007 | Wilk | H04R 1/086 | 381/369 |
| 2007/0238495 A1 * | 10/2007 | Hawker | H04R 1/2846 | 455/575.5 |

(Continued)

FOREIGN PATENT DOCUMENTS

| | | |
|---|---|---|
| CN | 108307285 A | 7/2018 |
| JP | 11-18182 A | 1/1999 |

(Continued)

*Primary Examiner* — Oyesola C Ojo
(74) *Attorney, Agent, or Firm* — Sughrue Mion, PLLC

(57) ABSTRACT

A sound component assembly includes: a sealing portion provided in a sound passage connected to a sound hole of an electronic device to surround a portion of the sound passage and contact at least a portion of a printed circuit board (PCB) having a sound module mounted thereon; and a cover portion disposed to face the PCB outside the sealing portion, wherein the sealing portion may include a first material, the cover portion may include a second material, and the second material may have a greater hardness than a hardness of the first material.

20 Claims, 21 Drawing Sheets

(56) References Cited

U.S. PATENT DOCUMENTS

| | | | | |
|---|---|---|---|---|
| 2008/0123891 | A1* | 5/2008 | Kato | H04R 1/06 381/361 |
| 2011/0170728 | A1* | 7/2011 | Chen | H04R 1/021 381/365 |
| 2012/0177237 | A1* | 7/2012 | Shukla | B29C 45/1671 381/87 |
| 2013/0108082 | A1* | 5/2013 | Dave | H04R 1/086 381/122 |
| 2013/0148837 | A1* | 6/2013 | Lee | H04R 19/016 381/369 |
| 2013/0223655 | A1* | 8/2013 | Lee | H04R 1/34 381/189 |
| 2017/0339475 | A1* | 11/2017 | Tang | H04R 1/023 |
| 2019/0199839 | A1* | 6/2019 | Jeon | H04M 1/18 |
| 2020/0228888 | A1* | 7/2020 | Sun | H04R 5/027 |
| 2021/0152903 | A1 | 5/2021 | Mietta et al. | |
| 2022/0312093 | A1* | 9/2022 | Pang | H01Q 1/243 |

FOREIGN PATENT DOCUMENTS

| | | | |
|---|---|---|---|
| JP | 11-41682 | A | 2/1999 |
| JP | 2008-35084 | A | 2/2008 |
| JP | 2016-15660 | A | 1/2016 |
| KR | 10-2017-0060068 | A | 5/2017 |
| KR | 10-2019-0034063 | A | 4/2019 |
| KR | 10-2019-0075021 | A | 6/2019 |
| KR | 10-2020-0038031 | A | 4/2020 |
| KR | 10-2020-0119105 | A | 10/2020 |

* cited by examiner

ELECTRONIC DEVICE INCLUDING SOUND COMPONENT ASSEMBLY

CROSS-REFERENCE TO THE RELATED APPLICATIONS

This application is a bypass continuation of International Application No. PCT/KR2022/008296, filed on Jun. 13, 2022, in the Korean Intellectual Property Receiving Office and claiming priority to Korean Patent Application No. 10-2021-0094271, filed on Jul. 19, 2021, in the Korean Intellectual Property Office, the disclosures of which are incorporated by reference herein in their entireties.

BACKGROUND

1. Field

Embodiments of the present disclosure relate to a sound component assembly and an electronic device including the same.

2. Description of Related Art

An electronic device including a smartphone, a wearable device, a tablet personal computer (PC), and the like may include sound components for receiving or emitting sounds. The sound components may be mounted in a housing of the electronic device to receive or emit sounds through a sound hole formed in the housing. A sound component assembly may include a waterproof structure for preventing foreign material from entering through the sound hole while mounted in the housing.

SUMMARY

Various example embodiments of the present disclosure provide a sound component assembly for preventing damage and an electronic device including the same.

Various example embodiments of the present disclosure provide a sound component assembly for improving the efficiency of an arrangement space and an electronic device including the same.

According to various example embodiments of the present disclosure, an electronic device includes: a housing including a sound hole that is connected to a sound passage within the housing; a printed circuit board (PCB) in the housing; a sound module on the PCB in the housing, and adjacent to the sound hole, the sound module including a speaker or a receiver that is configured to emit or receive a sound through the sound passage connected to the sound hole; and a sound component assembly positioned between the sound hole and the sound module, and surrounding at least a portion of the sound passage, wherein the sound component assembly includes: a sealing portion that surrounds the sound passage and that includes an internal cavity therein that communicates with the sound passage, the sound passage sealed by the sealing portion by a first side of the sealing portion contacting at least a portion of the PCB; a mesh portion that traverses the sound passage and contacts a second side of the sealing portion, opposite to the first side of the sealing portion, and the mesh portion is configured to block foreign material from passing therethrough; and a cover portion that faces the PCB and covers a portion of the sealing portion or a portion of the mesh portion.

According to various example embodiments of the present disclosure, a sound component assembly includes a sealing portion contacting at least a portion of a printed circuit board (PCB) having a sound module mounted thereon; and a cover portion that faces the PCB and covers the sealing portion, wherein the sealing portion includes a first material, the cover portion includes a second material, and the second material has a greater hardness than the first material.

According to various example embodiments of the present disclosure, an electronic device includes: a housing including a sound hole therein that is connected to a sound passage within the housing; a printed circuit board (PCB) in the housing; a sound module on the PCB in the housing, and adjacent to the sound hole, the sound module including a speaker or a receiver configured to emit or receive a sound through the sound passage connected to the sound hole; and a sealing portion that surrounds the sound passage and that includes an internal cavity therein that communicates with the sound passage. The sealing portion further includes: a protruding area protruding in a first direction toward the sound module to contact a portion of the PCB; and a base area contacting the protruding area and extending in a third direction orthogonal to the first direction, the sound passage sealed by the sealing portion by one side of the protruding area contacting the PCB. The electronic device further includes: a mesh portion including a mesh that traverses the sound passage while contacting the base area; and a cover portion that covers at least a portion of the sealing portion or a portion of the mesh portion, the cover portion having a greater hardness than a hardness of the sealing portion, wherein, in a view in which the mesh portion and the sealing portion are viewed from the PCB, a remaining portion of the mesh portion excluding a portion of the mesh portion that traverses the internal cavity, and a remaining portion of the sealing portion excluding the protruding area, are covered by the cover portion.

According to various example embodiments of the present disclosure, it is possible to reduce the possibility of damage to a sound component assembly including a waterproof structure.

According to various example embodiments of the present disclosure, it is possible to suppress an increase in space for installation in a housing where a sound component assembly is to be disposed by integrally forming a sealing portion and a cover portion.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
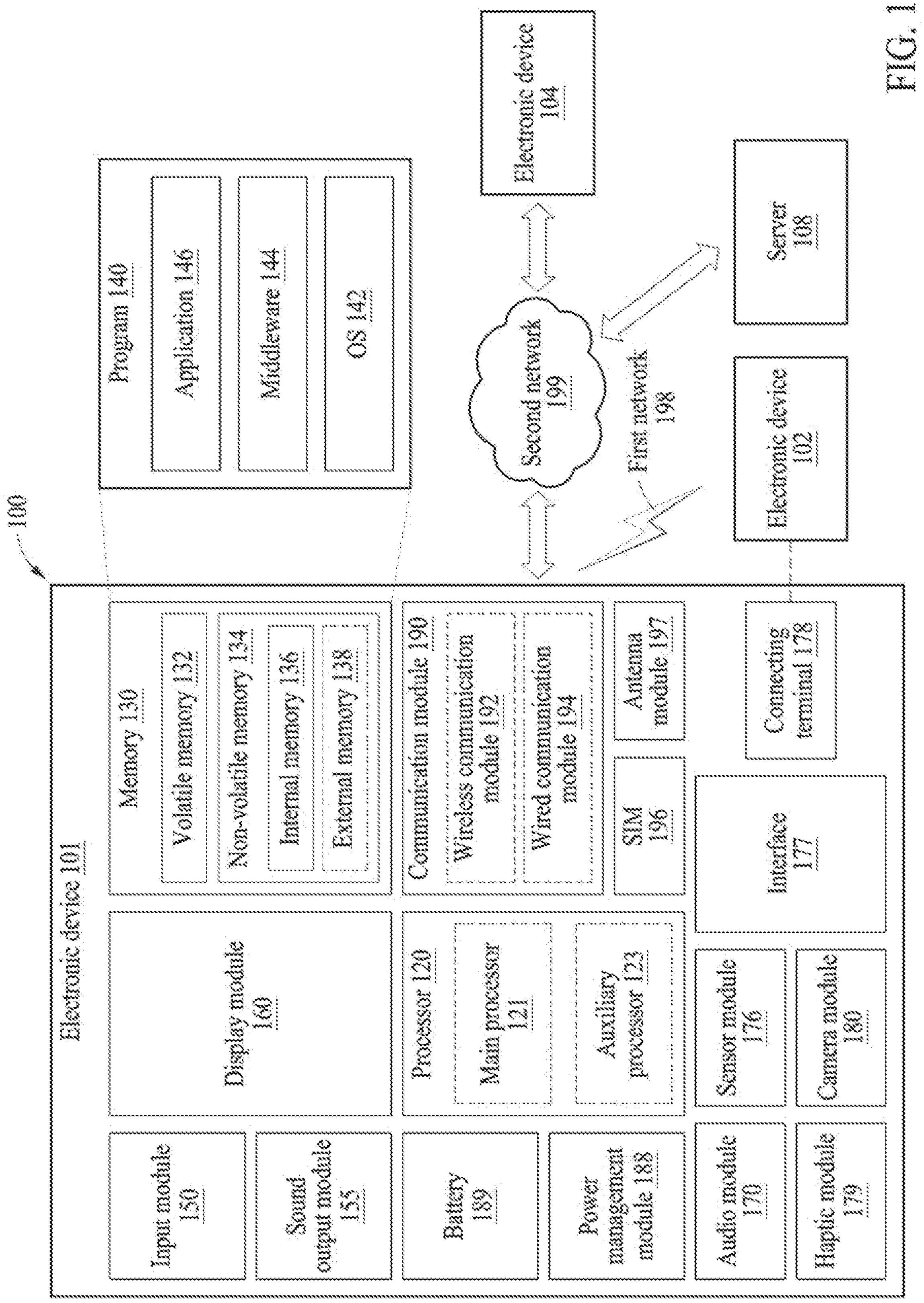
FIG. 1 is a block diagram of an electronic device in a network environment according to various example embodiments.

FIG. 1 is a block diagram of an electronic device in a network environment according to various example embodiments.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a portion of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a portion of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a portion of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the electronic device 104 via the server 108 coupled with the second network 199. Each of the external electronic devices (e.g., the electronic device 102 or the electronic device 104) may be a device of the same type as or a different type from the electronic device 101. According to an example embodiment, all or some of operations to be executed by the electronic device 101 may be executed at one or more of the external electronic devices (e.g., the electronic device 102, the electronic device 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a portion of the function or the service. The one or more external electronic devices receiving the request may perform at least the portion of the function or the service requested, or an additional function or an additional service related to the request, and may transfer an outcome of the performing to the electronic device 101. The electronic device 101 may provide the outcome, with or without further processing of the outcome, as at least a portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the electronic device 104 may include an Internet-of-things (IoT) device. The server 108 may be an intelligent server using machine learning and/or a neural network. According to an example embodiment, the electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments, and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," may each include any one of the items listed together in the corresponding one of the phrases, or all possible combinations thereof. Terms such as "first" and "second" may simply be used to distinguish the component from other components in question, and may not limit components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least portion of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
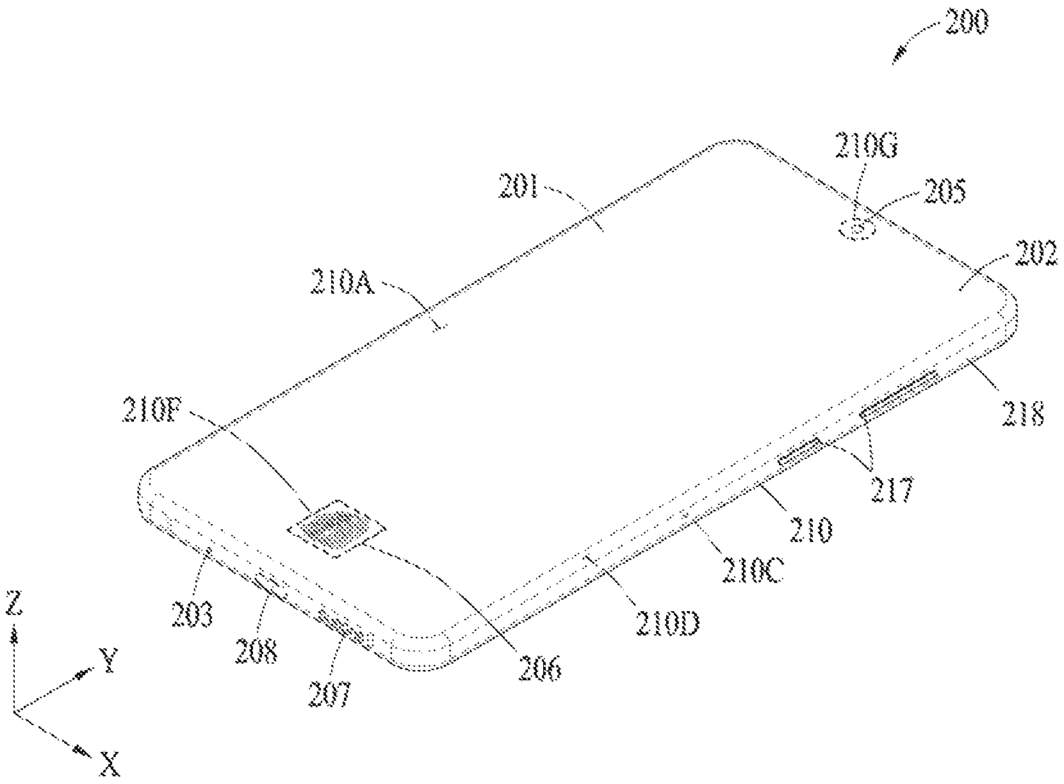
FIG. 2A is a first perspective views of an electronic device according to an example embodiment.
Figure 2B:
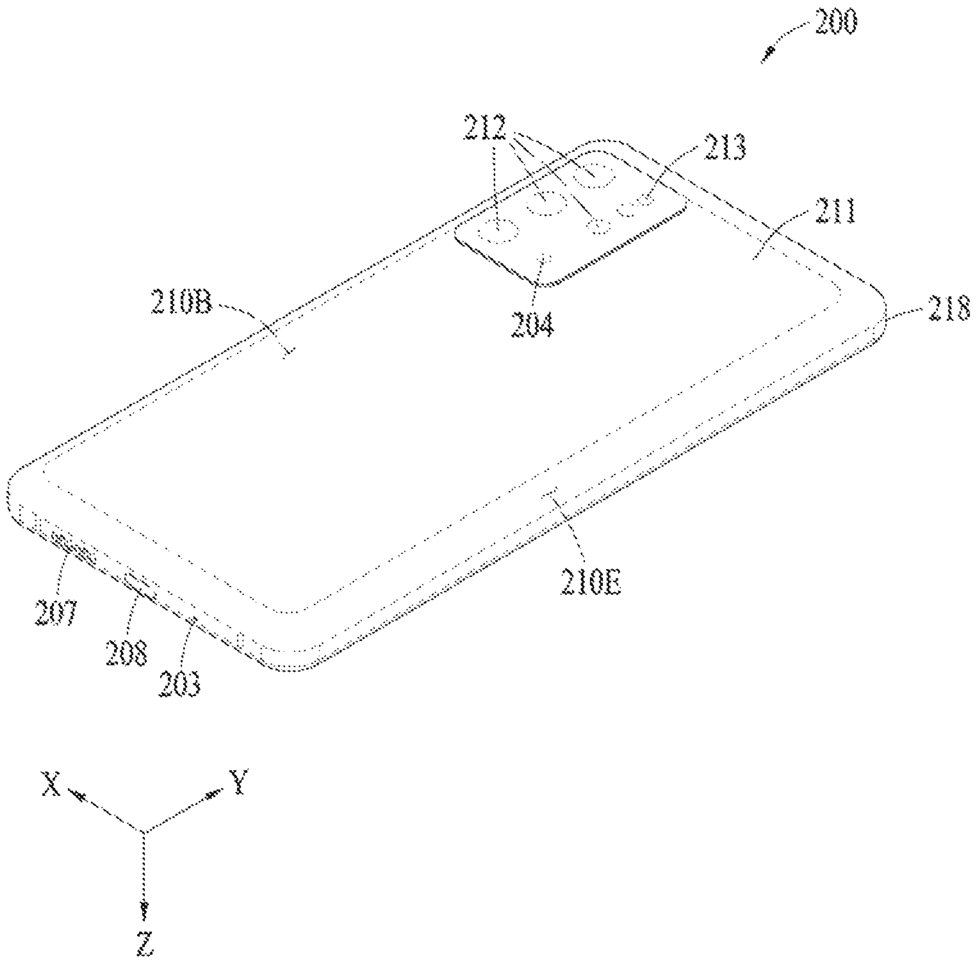
FIG. 2B is a second perspective views of an electronic device according to an example embodiment.

FIGS. 2A and 2B are perspective views of an electronic device according to an example embodiment.

Referring to FIGS. 2A and 2B, an electronic device 200 (e.g., the electronic device 101 of FIG. 1) may include a housing 210 having a first surface 210A (e.g., a front surface), a second surface 210B (e.g., a rear surface), and a side surface 210C surrounding a space between the first surface 210A and the second surface 210B. Meanwhile, the structure of the housing 210 described above is an example, and in another example embodiment (not shown), the housing 210 may refer to a structure that forms a portion of the first surface 210A, the second surface 210B, and the side surface 210C.

In an example embodiment, the first surface 210A may be formed of a front plate 202 of which at least a portion is substantially transparent. For example, the front plate 202 may include a polymer plate or a glass plate including various coating layers.

In an example embodiment, the second surface 210B may be formed of a rear plate 211 (e.g., a rear plate 280 of FIG. 3) that is substantially opaque. For example, the rear plate 211 may be formed of coated or colored glass, ceramic, polymer, metal materials (e.g., aluminum, stainless steel (STS), or magnesium) or a combination of at least two of the above materials. The side surface 210C may be coupled to the front plate 202 and the rear plate 211 and may be formed of a side bezel structure 218 (e.g., a frame structure 241 of FIG. 3) including metal and/or polymer.

In another example embodiment, the rear plate 211 and the side bezel structure 218 may be integrally formed and may include the same material (e.g., a metal material such as aluminum).

In the illustrated example embodiment, the front plate 202 may include two first areas 210D that are curved and extend seamlessly in a direction from a partial area of the first surface 210A toward the rear plate 211. The first areas 210D may be positioned at two opposite long edges of the front plate 202.

In the illustrated example embodiment, the rear plate 211 may include two second areas 210E that are curved and extend seamlessly in a direction from a partial area of the second surface 210B toward the front plate 202. The second areas 210E may be included at two opposite long edges of the rear plate 211.

In another example embodiment, the front plate 202 (or the rear plate 211) may include only one of the first areas 210D (or the second areas 210E). In still another example embodiment, the front plate 202 (or the rear plate 211) may not include a portion of the first areas 210D (or the second areas 210E).

In an example embodiment, when viewed from a side surface of the electronic device 200, the side bezel structure 218 may have a first thickness (or width) in a direction of a side surface (e.g., a short side) not including the first areas 210D or the second areas 210E, and have a second thickness less than the first thickness in a direction of a side surface (e.g., a long side) including the first areas 210D or the second areas 210E. In some example embodiments, the side bezel structure 218 may be integrally formed with the rear plate 211.

In an example embodiment, the electronic device 200 may include at least one of a display 201 (e.g., a display 230 of FIG. 3), an audio module (e.g., a microphone hole 203 of FIGS. 2A and 2B), a sensor module (not shown), a second sensor module 206, a first camera module 205, key input devices 217, a light-emitting element (not shown), and a connector hole 208. In another example embodiment, the electronic device 200 may not include at least one (e.g., the key input devices 217 or the light-emitting element (not shown)) of the components, or may additionally include other components.

In an example embodiment, the display 201 may be exposed through at least a portion of the front plate 202. For example, at least a portion of the display 201 may be exposed through the front plate 202 including the first surface 210A and the first areas 210D of the side surface 210C.

In an example embodiment, the display 201 may be formed in a shape substantially the same as an adjacent outer shape of the front plate 202. In another example embodiment (not shown), to expand an exposed area of the display 201, a distance between outer edges of the display 201 and a distance between outer edges of the front plate 202 may be substantially the same.

In an example embodiment, a surface of the housing 210 (or the front plate 202) may include a screen display area in which the display 201 is visually exposed and displays content via pixels. For example, the screen display area may include the first surface 210A and the first areas 210D of the side surface.

In another example embodiment (not shown), the display 201 may include a touch sensing circuit, a pressure sensor for measuring an intensity (pressure) of a touch, and/or a digitizer for detecting a magnetic-type stylus pen, or may be disposed adjacent thereto.

In an example embodiment, the first surface 210A may include a sensing area 210F and/or a camera area 210G.

In an example embodiment, the sensing area 210F may at least partially overlap the first surface 210A. The sensing area 210F may be an area for displaying content like the other area of the first surface 210A and additionally for transmitting an input signal related to the second sensor module 206.

In an example embodiment, at least a portion of the second sensor module 206 may be disposed below the first surface 210A. The second sensor module 206 may form the sensing area 210F in at least a portion of the first surface 210A. The second sensor module 206 may be configured to receive the input signal transmitted through the sensing area 210F and generate an electrical signal based on the received input signal. For example, the input signal may have a designated physical quantity (e.g., heat, light, temperature, sound, pressure, or ultrasound). For example, the input signal may include a signal related to biometric information (e.g., a fingerprint) of a user.

For example, the second sensor module 206 may include an optical fingerprint sensor configured to receive light. For example, the second sensor module 206 may be configured to receive an optical signal that is emitted from a pixel included in the display 201, reflected by a fingerprint of a user, transmitted through the sensing area 210F.

For example, the second sensor module 206 may include an ultrasonic fingerprint sensor configured to transmit and receive ultrasonic waves. For example, the second sensor module 206 may include a transmission module for transmitting an ultrasonic wave toward the fingerprint of the user, and a reception module for receiving an ultrasonic wave that is reflected by a finger of the user and transmitted through the sensing area 210F.

In an example embodiment, the camera area 210G may at least partially overlap the first surface 210A. The camera area 210G may be an area (e.g., a transmissive area) for displaying content like the other area of the first surface 210A and additionally for transmitting an optical signal related to the first camera module 205. For example, the camera area 210G may be configured to display content like the other area of the first surface 210A when the first camera module 205 is not operating. In an example embodiment, the camera area 210G of the display 201 may be formed of a transmissive area having a designated transmittance. For example, the transmissive area may be formed to have a transmittance in the range of approximately 20% to approximately 40%. The transmissive area may include an area having a lower pixel density and/or wiring density than a surrounding area.

In an example embodiment, at least a portion of the first camera module 205 may be disposed below the first surface 210A and configured to receive light passing through the camera area 210G. For example, the light received by the first camera module 205 may include light reflected by or emitted from a subject. The first camera module 205 may be configured to generate an electrical signal related to an image based on the received light. The first camera module 205 may not be exposed through a surface (e.g., the first surface 210A) of the electronic device 200. For example, the first camera module 205 may be covered by content displayed in the camera area 210G. For example, an optical axis of a lens included in the first camera module 205 may be disposed to pass through the camera area 210G included in the display 201.

In an example embodiment, the second camera module 212 may include a plurality of camera modules (e.g., a dual camera, a triple camera, or a quad camera). However, the second camera module 212 is not necessarily limited to including a plurality of camera modules and may include only one camera module.

In an example embodiment, the first camera module 205 and/or the second camera module 212 may include one or more lenses, an image sensor, and/or an image signal processor (ISP). A flash 213 may include, for example, a light-emitting diode (LED) or a xenon lamp. In another example embodiment, two or more lenses (an infrared camera, a wide-angle lens, and a telephoto lens) and image sensors may be arranged in the housing to face a direction toward one surface (e.g., the second surface 210B) of the electronic device 200.

In an example embodiment, a sensor module (not shown) may generate an electrical signal or a data value corresponding to an internal operating state of the electronic device 200 or an external environmental state. In an example embodiment, a sensor module (not shown) may be disposed on the first surface 210A, the second surface 210B, or at least a portion of the side surface 210C (e.g., the first areas 210D and/or the second areas 210E) of the housing 210.

In various example embodiments, the sensor module and/or the second sensor module 206 may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor. In some example embodiments (not shown), the fingerprint sensor may be disposed on the second surface 210B.

In an example embodiment, an audio module may include a sound hole (e.g., the microphone hole 203) and a speaker hole 207.

In an example embodiment, the microphone hole may include a microphone hole 203 (e.g., a first microphone hole) formed in a partial area of the side surface 210C and a microphone hole 204 (e.g., a second microphone hole) formed in a partial area of the second surface 210B. Microphones for obtaining external sounds by the microphone hole 203 and the microphone hole 204 may be arranged in the housing 210. The microphones may include a plurality of sound modules (e.g., microphones) to sense the direction of sounds. In an example embodiment, the microphone hole 204 formed in the partial area of the second surface 210B may be disposed adjacent to the first camera module 205.

For example, the microphone hole 204 may obtain a sound when the first camera module 205 is executed or other functions are executed. Although not shown, the microphone hole 203 may be formed in another portion of the side surface 210C. For example, the microphone hole 203 may be formed in a portion (e.g., a portion facing a −Y-axial direction) of the side surface 210C in which the speaker hole 207 is formed and another portion (e.g., a portion facing a +Y-axial direction) of a facing side surface 210C.

In an example embodiment, the speaker hole 207 may include a receiver hole for call (not shown). The speaker hole 207 may be formed in a portion of the side surface 210C of the electronic device 200. In another example embodiment, the speaker hole 207 and the microphone hole 203 may be implemented as a single hole. Although not shown, the receiver hole for call (not shown) may be formed in another portion of the side surface 210C. For example, the receiver hole for call (not shown) may be formed in a portion (e.g., a portion facing a −Y-axial direction) of the side surface 210C in which the speaker hole 207 is formed and another portion (e.g., a portion facing a +Y-axial direction) of the side surface 210C.

In an example embodiment, the electronic device 200 may include a speaker that is fluidly connected to the speaker hole 207. In another example embodiment, the speaker may include a piezoelectric speaker without the speaker hole 207.

In an example embodiment, the key input devices 217 may be disposed on the side surface 210C (e.g., the first areas 210D and/or the second areas 210E) of the housing 210. In another example embodiment, the electronic device 200 may not include a portion or all of the key input devices 217, and the key input devices 217 that are not included may be implemented in other forms such as soft keys on the display 201. In another example embodiment, the key input devices 217 may include the second sensor module 206 that forms the sensing area 210F included in the first surface 210A.

In an example embodiment, the connector hole 208 may accommodate a connector. The connector hole 208 may be disposed in the side surface 210C of the housing 210. For example, the connector hole 208 may be disposed in the side surface 210C to be adjacent to at least a portion of the audio module (e.g., the microphone hole 203 and the speaker hole 207). In another example embodiment, the electronic device 200 may include the connector hole 208 (e.g., a first connector hole) for accommodating a connector (e.g., a USB connector) for transmitting/receiving power and/or data to or from an external electronic device and/or a second connector hole (not shown) for accommodating a connector (e.g., an earphone jack) for transmitting/receiving audio signals to or from the external electronic device.

In an example embodiment, the electronic device 200 may include the light-emitting element (not shown). For example, the light-emitting element (not shown) may be disposed on the first surface 210A of the housing 210. The light-emitting element (not shown) may provide state information of the electronic device 200 in the form of light. In another example embodiment, the light-emitting element (not shown) may provide a light source that is linked to the operation of the first camera module 205. For example, the light-emitting element (not shown) may include a light-emitting diode (LED), an infrared (IR) LED, and/or a xenon lamp.

Figure 3:
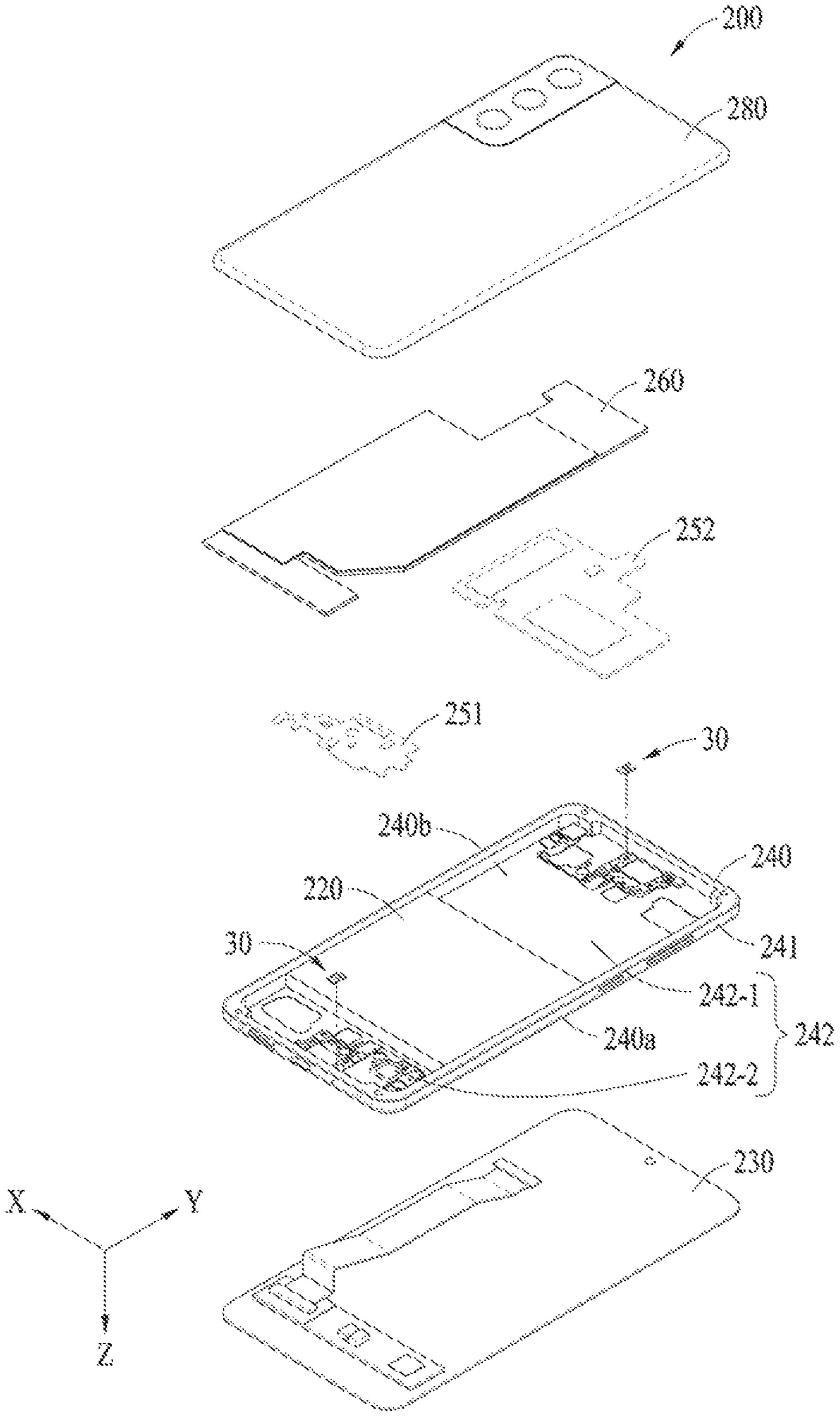
FIG. 3 is an exploded perspective view of an electronic device according to an example embodiment.

FIG. 3 is an exploded perspective view of the electronic device 200 according to an example embodiment.

Referring to FIG. 3, the electronic device 200 may include a front plate (e.g., the front plate 202 of FIG. 2A), the display 230 (e.g., the display 201 of FIG. 2A), a first member 240 (e.g., a bracket), a first PCB 251, a second PCB 252, a battery 220, a second member 260, and a rear plate 280 (e.g., the rear plate 211 of FIG. 2B). In some example embodiments, the electronic device 200 may omit at least one of the components or may additionally include other components. At least one of the components of the electronic device 200 may be the same as or similar to at least one of the components of the electronic device 200 of FIGS. 2A and 2B, and thus, a repeated description thereof will be omitted hereinafter.

In various example embodiments, the frame structure 241 of the front plate (e.g., the front plate 202 of FIG. 2A), the rear plate 280, and the first member 240 may form a housing (e.g., the housing 210 of FIGS. 2A and 2B). In various example embodiments, the front plate (e.g., the front plate 202 of FIG. 2A) and the display 230 may be referred to as a display module. For example, the front plate (e.g., the front plate 202 of FIG. 2A) may include at least one layer included in the display module.

In an example embodiment, the first member 240 may include the frame structure 241 and a plate structure 242. In an example embodiment, the frame structure 241 may be formed to surround a periphery of the plate structure 242. For example, the frame structure 241 may form a portion of the housing (e.g., the housing 210 of FIG. 2A). For example, the frame structure 241 may surround a space between the front plate (e.g., the front plate 202 of FIG. 2A) and the rear plate 280 and form a portion of a surface (e.g., a side surface) of the electronic device 200. For example, the frame structure 241 may be formed to connect a periphery of the front plate (e.g., the front plate 202 of FIG. 2A) and a periphery of the rear plate 280. In an example embodiment, the plate structure 242 may be a structure in which various structures included in the electronic device are disposed. For example, the display 230, the first PCB 251, and the second PCB 252 may be disposed in the plate structure 242.

In an example embodiment, the plate structure 242 of the first member 240 may include a first surface 240*a* at least partially facing the display 230 and a second surface 240*b* at least partially facing the rear plate 280. For example, the first surface 240*a* may be a surface facing a +z-axial direction, and the second surface 240*b* may be a surface facing a −z-axial direction. In an example embodiment, at least a portion of the display 230 may be positioned on the first surface 240*a* of the plate structure 242. In an example embodiment, at least a portion of each of the first PCB 251 and the second PCB 252 may be positioned on the second surface 240*b* of the plate structure 242. In an example embodiment, the battery 220 may be disposed on the second surface 240*b* of the plate structure 242.

In an example embodiment, the plate structure 242 may include a first portion 242-1 defined on one side of the battery 220 and a second portion 242-2 defined on the other side of the battery 220. For example, the first portion 242-1 may be positioned in a +y-axial direction relative to the battery 220, and the second portion 242-2 may be positioned in a −y-axial direction relative to the battery 220. For example, at least a portion of the second PCB 252 may be disposed in the first portion 242-1. For example, at least a portion of the first PCB 251 may be disposed on the second portion 242-2.

In an example embodiment, the battery 220, which is a device for supplying power to at least one component of the electronic device 200, may include, for example, a primary cell that is not rechargeable, a secondary cell that is rechargeable, or a fuel cell. In an example embodiment, the battery 220 may be disposed on the second surface 240*b* of the plate structure 242.

In an example embodiment, the second member 260 may be disposed to at least partially cover the second surface 240*b* of the plate structure 242, and a PCB (not shown) may be disposed on a surface of the second member 260 that faces the second surface 240*b*. In an example embodiment, the PCB (not shown) may electrically connect the first PCB 251 and the second PCB 252. For example, a conductive pattern for electrically connecting the first PCB 251 and the second PCB 252 may be formed on the PCB (not shown).

In an example embodiment, an antenna (not shown) may be provided on the second member 260. For example, the antenna (not shown) may be provided on a surface of the second member 260 that faces the rear plate 280. The antenna (not shown) may include, for example, a near field communication (NFC) antenna, a wireless charging antenna, and/or a magnetic secure transmission (MST) antenna. For example, the antenna (not shown) may be configured to perform short-range communication with an external device or wirelessly transmit/receive the power needed for charging.

In an example embodiment, a processor, a memory, and/or an interface may be disposed on the first PCB 251 and the second PCB 252. The processor may include, for example, one or more of a central processing unit, an application processor, a graphics processing unit, an image signal processor, a sensor hub processor, and a communication processor. In an example embodiment, the interface may include, for example, an HDMI, a USB interface, an SD card interface, or an audio interface. For example, the interface may electrically or physically connect the electronic device 200 to an external electronic device, and may include a USB connector, an SD card/multimedia card (MMC) connector, or an audio connector.

In an example embodiment, the memory may include, for example, a volatile memory or a non-volatile memory.

Figure 4A:
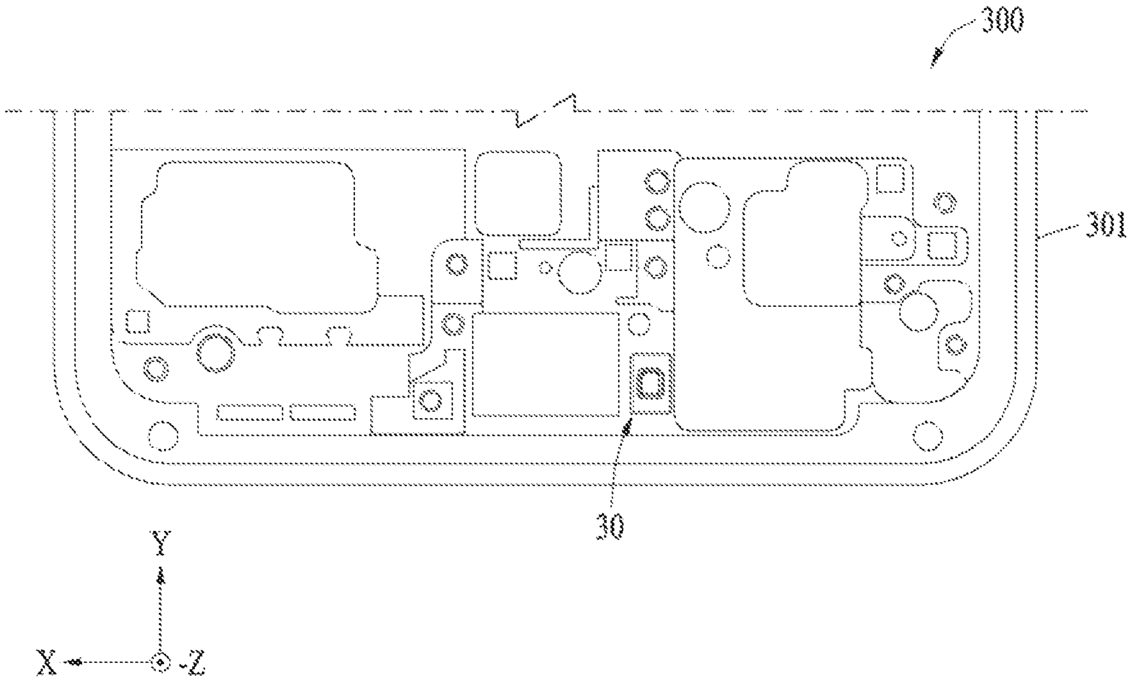
FIG. 4A is a plan view illustrating a sound component assembly disposed in a housing according to an example embodiment.
Figure 4B:
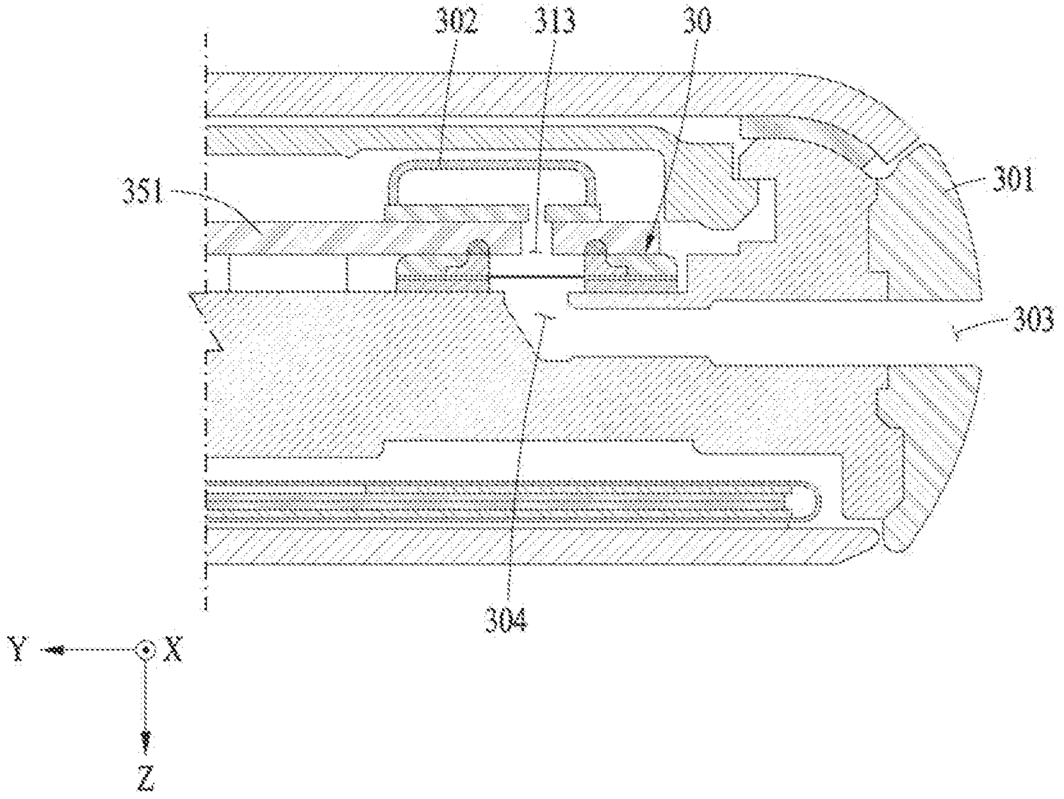
FIG. 4B is a cross-sectional view illustrating a sound component assembly disposed in a housing of an electronic device according to an example embodiment.

FIG. 4A is a plan view illustrating a sound component assembly disposed in a housing 301 of an electronic device 300 according to various example embodiments. FIG. 4B is a cross-sectional view illustrating the sound component assembly disposed in the housing 301 of the electronic device 300 according to various example embodiments.

Referring to FIGS. 4A and 4B, an electronic component assembly may be disposed in the electronic device 300 (e.g., the electronic device 200 of FIG. 2A). For example, the electronic component assembly may be a sound component assembly 30 disposed adjacent to a sound module 302 capable of receiving or emitting a sound in a direction of a front surface, a rear surface, or a side surface of the electronic device 300. The sound component assembly 30 may prevent foreign material (e.g., moisture) introduced through a sound hole 303 from penetrating into the sound module 302. In addition, the sound component assembly 30 may guide the sound introduced through the sound hole 303 to the sound module 302 or guide a sound from the sound module 302 to an outside of the sound hole 303.

For example, the sound hole 303 may include a microphone hole (e.g., the microphone hole 203 of FIG. 2A and/or the microphone hole 204 of FIG. 2B) formed in one surface (e.g., a partial area of the side surface 210C of FIG. 2A and/or a partial area of the second surface 210B of FIG. 2B) of the housing 301 of the electronic device 300. A sound passage 304 in the housing 301 may be connected to the sound hole 303, such that a sound from the outside of the housing 301 may be introduced through the sound passage 304 into the housing 301. The sound passage 304 may be connected to the sound module 302 capable of obtaining a sound from the outside of the housing 301. For example, the sound module 302 may be a microphone module capable of detecting a sound.

Alternatively, for example, the sound hole 303 may include a speaker hole (e.g., the speaker hole 207 of FIG. 2A) formed in one surface (e.g., a portion of the side surface 210C of FIG. 2A) of the housing 301 of the electronic device 300. The sound passage 304 in the housing 301 may be connected to the sound hole 303, and a sound from the sound module 302 may be emitted through the sound passage 304 to the outside of the housing 301. For example, the sound module 302 may be a speaker.

In an example embodiment, the sound component assembly 30 may include a structure that is positioned between the sound hole 303 and the sound module 302 and surrounds a portion of the sound passage 304. For example, as shown in FIG. 4B, the sound component assembly 30 may be in contact with a PCB 351 including the sound module 302 to be sealed, thereby preventing sound leak and causing the sound to be transmitted from the sound hole 303 to the sound module 302 through an internal cavity 313. The sound component assembly 30 may include a waterproof structure (e.g., a mesh portion 340 of FIG. 5A) disposed to traverse the sound passage 304, thereby blocking the introduction of moisture or foreign material introduced through the sound hole 303 into the sound module 302 and guiding only a sound introduced through the sound hole 303 to the sound module 302.

Figure 5A:
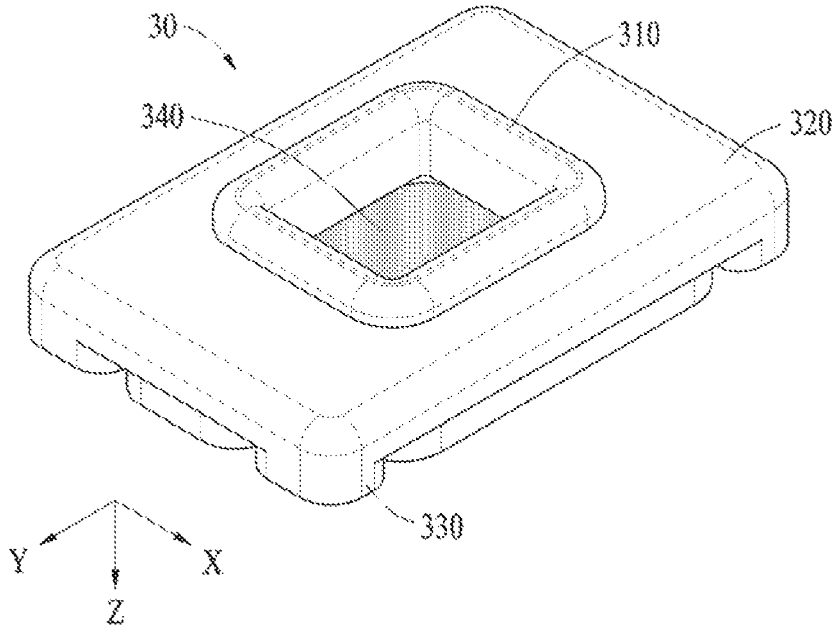
FIG. 5A is a perspective view of a sound component assembly according to an example embodiment.
Figure 5B:
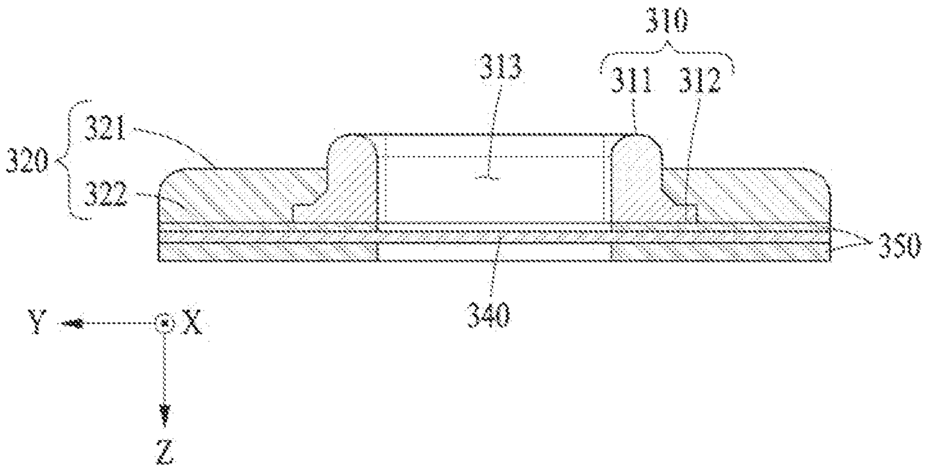
FIG. 5B is a cross-sectional view of a sound component assembly according to an example embodiment.
Figure 5C:
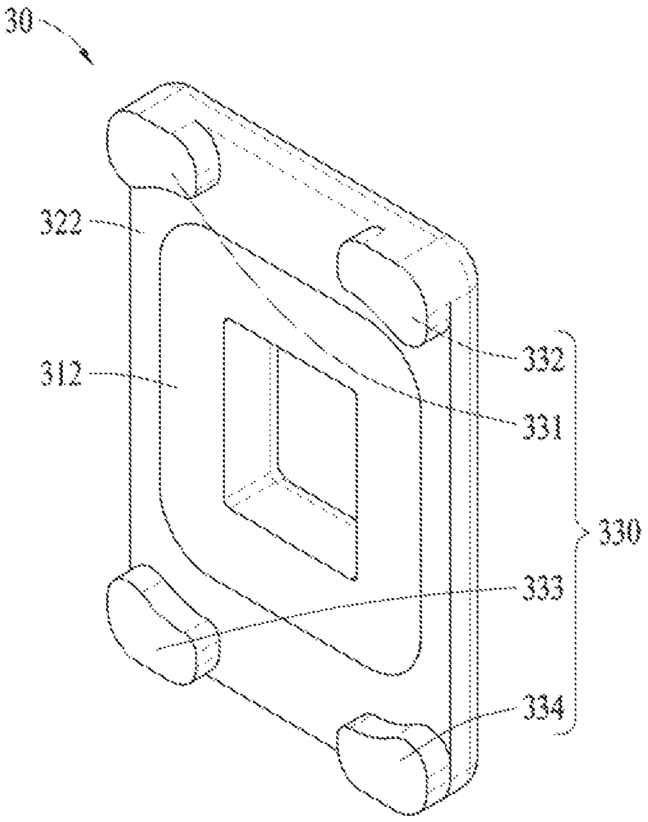
FIG. 5C illustrates a portion of a sound component assembly viewed from a base area according to an example embodiment.

FIG. 5A is a perspective view of the sound component assembly 30 according to an example embodiment, FIG. 5B is a cross-sectional view of the sound component assembly 30 according to an example embodiment, and FIG. 5C illustrates a portion of the sound component assembly 30 viewed from a base area 312 of a sealing portion 310 according to an example embodiment.

Referring to FIGS. 5A, 5B and 5C, the sound component assembly 30 may include the sealing portion 310, a cover portion 320, a support 330, and a mesh portion 340.

In an example embodiment, the sealing portion 310 may include a protruding area 311, and the protruding area 311 may protrude in a first direction (e.g., a −Z direction in FIGS. 5A and 5B) from the outside of the internal cavity 313 toward the sound module 302 while forming the internal cavity 313 that communicates with the sound passage 304. The sealing portion 310 may include the base area 312 on an opposite side (e.g., an area of the sealing portion 310 facing a +Z direction in FIGS. 5A and 5B) of the protruding area 311. For example, when the sealing portion 310 is disposed in the housing 301, the protruding area 311 may be pressed on one surface of the PCB 351 (e.g., a surface of the PCB 351 facing the +Z direction in FIG. 4B) with the sound module 302 mounted thereon.

In an example embodiment, the cover portion 320 may be disposed to cover at least a portion of the sealing portion 310 and face the PCB 351 with the sound module 302 mounted thereon. In an example embodiment, the cover portion 320 may include a cover surface 321 surrounding the outer side of the protruding area 311 of the sealing portion 310 and facing the PCB 351 with the sound module 302 mounted thereon, and a base surface 322 surrounding the outer side of the base area 312 of the sealing portion 310 and formed on an opposite side (e.g., an area of the cover portion 320 facing the +Z direction in FIGS. 5A and 5B) of the cover surface 321.

In an example embodiment, the protruding area 311 of the sealing portion 310 may have a higher protrusion height than a height of the cover surface 321 of the cover portion 320 in the first direction (e.g., the −Z direction in FIGS. 5A and 5B), such that the sealing and/or pressing between the protruding area 311 and one surface of the PCB 351 (e.g., the surface of the PCB 351 facing the +Z direction in FIG. 4B) may be implemented. In addition, the cover portion 320 may cover a remaining portion of the sealing portion 310 excluding the protruding area 311, such that when viewed from the PCB 351 (e.g., the sound component assembly 30 is viewed from the PCB 351 in the +Z direction in FIG. 4B), a remaining portion of the mesh portion 340 excluding a portion exposed through the internal cavity 313 and remaining portions of the sealing portion 310 excluding the protruding area 311 may be covered by the cover portion 320.

In an example embodiment, the sealing portion 310 may be formed of a first material, the cover portion 320 may be formed of a second material, and the second material may have a greater hardness than the first material. For example, the sealing portion 310 may be formed of a soft material having elasticity, and the cover portion 320 may be formed of a hard material. For example, the first material may be rubber, silicone, or urethane, and the second material may be plastic or metal. Since the sealing portion 310 and the mesh portion 340 are formed of soft materials, an impact (or pressure) applied from another structure (e.g., the PCB 351) during the manufacturing (e.g., assembly) of the electronic device 300 may wrinkle or damage the mesh portion 340, resulting in low acoustic performance or waterproof performance, or may damage the sealing portion 310, causing sound leakage. However, the hard cover portion 320 of the sound component assembly 30 may cover the portions of the soft sealing portion 310 excluding the protruding area 311, thereby preventing the mesh portion 340 or the sealing portion 310 from being damaged by an impact applied from another structure (e.g., the PCB 351).

For example, in a state in which the sound component assembly 30 is disposed in the housing 301, the PCB 351 with the sound module 302 mounted thereon may be mounted in the housing 301. In this example, the PCB 351 may be introduced slantly (e.g., in a direction D1 of FIG. 6B) in a sliding manner such as to not hinder the function of another module (e.g., a USB module). At this time, even when the PCB 351 presses the sound component assembly 30, the cover portion 320 may prevent the sound component assembly 30 from being excessively pressed, such that the mesh portion 340 may not be damaged.

In an example embodiment, the sealing portion 310 and the cover portion 320 may be integrally formed. For example, the sealing portion 310 and the cover portion 320 may be formed by double injection. For example, the sealing portion 310 may be formed of a rubber material, and the cover portion 320 may be formed of a plastic material. In this example, in a state in which the shape of the cover portion 320 of the plastic material is implemented first, a central portion of the cover portion 320 may be filled with a source material, which is a rubber material to fit the shape of the sealing portion 310, whereby the sealing portion 310 and the cover portion 320 may be integrally formed by double injection. Forming the sealing portion 310 and the cover portion 320 by double injection may reduce an increase in volume. Alternatively, for example, the sealing portion 310 and the cover portion 320 may be formed by insert injection. For example, the cover portion 320 may be inserted into a mold, and then the mold may be filled with a plastic resin, which is a source material of the sealing portion 310, whereby the sealing portion 310 and the cover portion 320 may be integrally formed by insert injection.

In an example embodiment, the base area 312 of the sealing portion 310 and the base surface 322 of the cover portion 320 may be formed on the same plane. When the base area 312 and the base surface 322 are placed on the same plane, the mesh portion 340 may stably contact the sealing portion 310 and one surface (e.g., the surface viewed in the −Z direction from the sound passage 304 in FIG. 4B) of the cover portion 320.

In an example embodiment, the mesh portion 340 may include a mesh that does not allow moisture or foreign material to pass therethrough but allows a sound to pass therethrough. The mesh may be disposed to traverse the internal cavity 313, and an outer portion thereof excluding a portion corresponding to the internal cavity 313 may be coupled to the base area 312 of the sealing portion 310 and/or the base surface 322 of the cover portion 320. A coupling member 350 may be disposed between the base area 312 and the mesh portion 340 and/or between the base surface 322 and the mesh portion 340, and the coupling member 350 may be, for example, a double-sided tape. On one surface (e.g., the surface viewed from the cover portion 320 in the +Z direction in FIG. 5B) of the mesh portion 340, the coupling member 350 may be positioned on a remaining portion of the mesh portion 340 excluding the portion corresponding to the internal cavity 313. The coupling member 350 may also be disposed on the other surface (e.g., the surface viewed toward the cover portion 320 in the −Z direction in FIG. 5B) of the mesh portion 340, and the sound component assembly 30 may be stably coupled to a bracket (e.g., the first member 240 of FIG. 3) through the coupling member 350, where the coupling member 350 may include a waterproof tape.

In an example embodiment, the base area 312 of the sealing portion 310 may be formed to extend from the protruding area 311 in a direction of the outer side of the internal cavity 313 (e.g., a ±Y direction in FIG. 5B), such that the base area 312 may have a larger area than the protruding area 311. Based on a state in which the protruding area 311 and the base area 312 are viewed in a second direction (e.g., a +Z direction in FIG. 5B) (e.g., a state in which the sound component assembly 30 is viewed from the PCB 351 in the +Z direction in FIG. 4B), the area of the protruding area 311 may be larger than the area of the base area 312, which may increase a contact area between the coupling member 350 and the sealing portion 310 and thereby prevent the sealing portion 310 from being torn out as being rubbed by an impact from another structure (e.g., the PCB 351).

The cover surface 321 of the cover portion 320 may be formed to cover the base area 312, and the base area 312 of the sealing portion 310 and the base surface 322 of the cover portion 320 may be attached to the coupling member 350, such that the deformation of the sound component assembly 30 may be prevented.

Figure 6A:
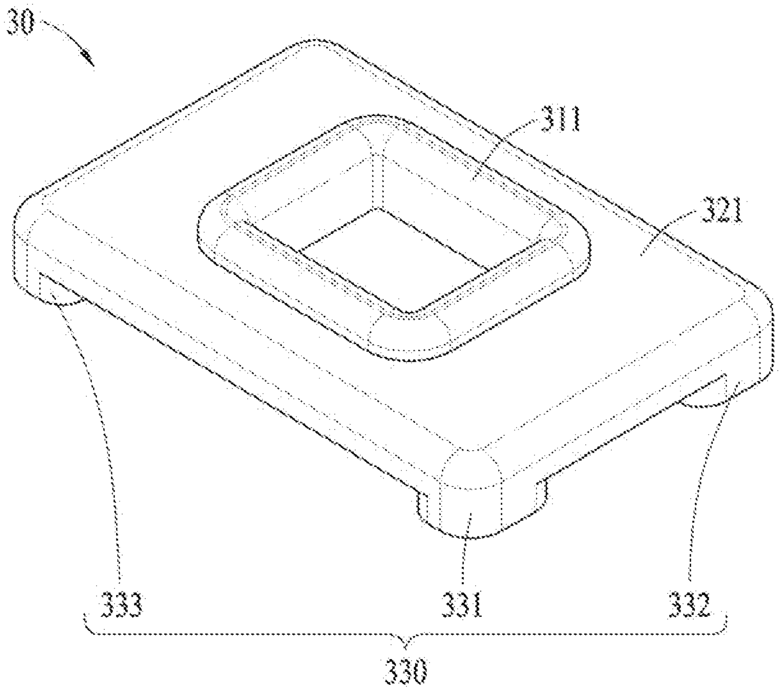
FIG. 6A is a perspective view illustrating a support of a sound component assembly according to an example embodiment.
Figure 6B:
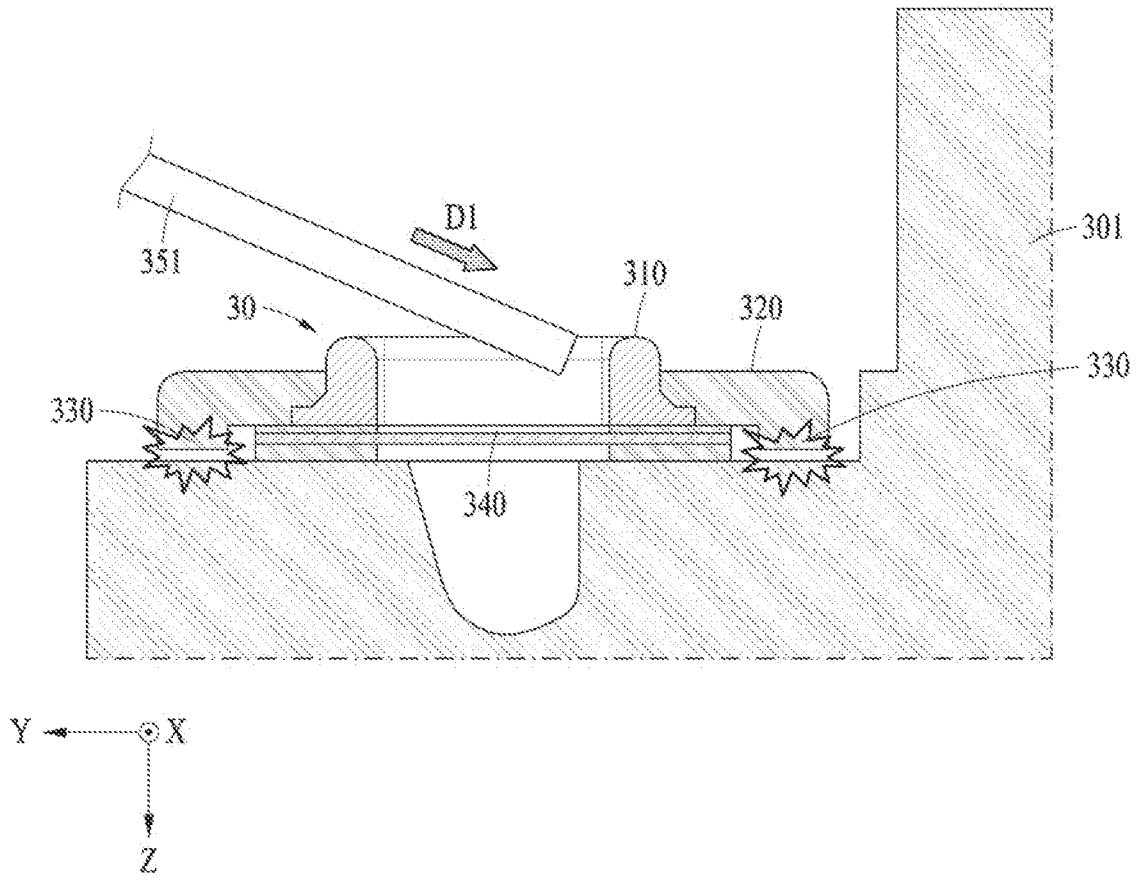
FIG. 6B schematically illustrates a function of a support of a sound component assembly according to an example embodiment.

FIG. 6A illustrates the support 330 of the sound component assembly 30 according to an example embodiment, and FIG. 6B schematically illustrates a function of the support 330 of the sound component assembly 30 according to an example embodiment.

Referring to FIGS. 6A and 6B, the sound component assembly 30 may include the support 330 formed to protrude in the second direction (e.g., a +Z direction of FIG. 6B).

In an example embodiment, the support 330 may include a plurality of support members (e.g., a first support member 331, a second support member 332, a third support member 333, and a fourth support member 334) (refer to FIGS. 5C and 6A), and the plurality of support members may be formed to protrude from corners of the base surface 322 of the cover portion 320 in the second direction. For example, referring to FIG. 5C, when the base surface 322 is formed in a quadrangular shape, the first support member 331, the second support member 332, the third support member 333, and the fourth support member 334 may be disposed respectively at four corners of the base surface 322.

In an example embodiment, the support members (e.g., the first to fourth support members 331, 332, 333, and 334) may protrude the same distance from the base surface 322 and have a height so as to not interfere with the coupling between the sound component assembly 30 and the bracket (e.g., the first member 240 of FIG. 3). Even when the cover surface 321 of the sound component assembly 30 is pressed as the above-described PCB 351 is assembled slantly (e.g., in the direction D1 of FIG. 6B) in a sliding manner, the support members may support the cover portion 320 to prevent the cover portion 420 from being excessively pressed, thereby preventing the mesh portion 340 from being wrinkled or damaged. Meanwhile, the shape of the support members is not limited to the shown example. For example, the support members may have a protruding shape according to the shape of the base surface 322 and the geometry of a structure in which the sound component assembly 30 is seated.

Figure 7A:
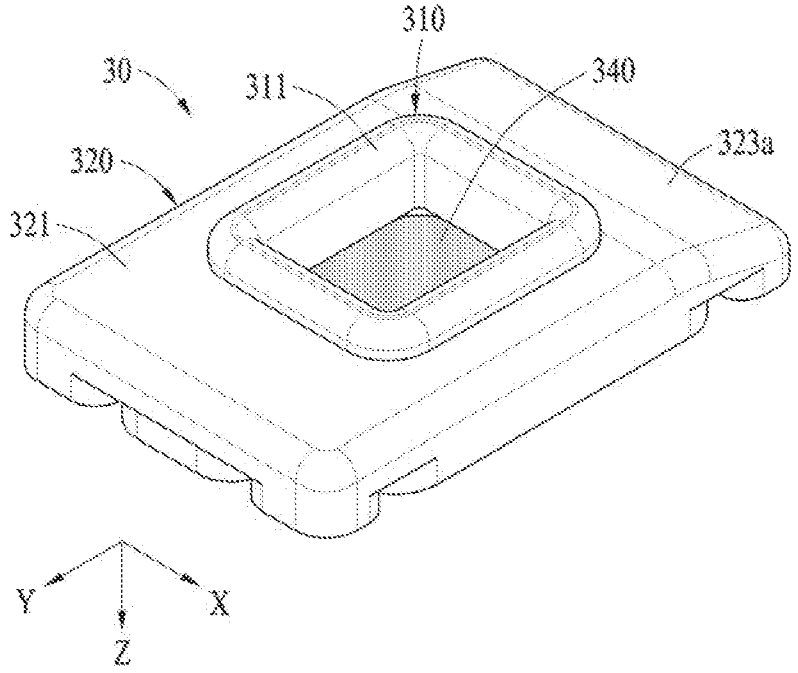
FIG. 7A is a plan view of a sound component assembly including an inclined recessed area according to an example embodiment.
Figure 7B:
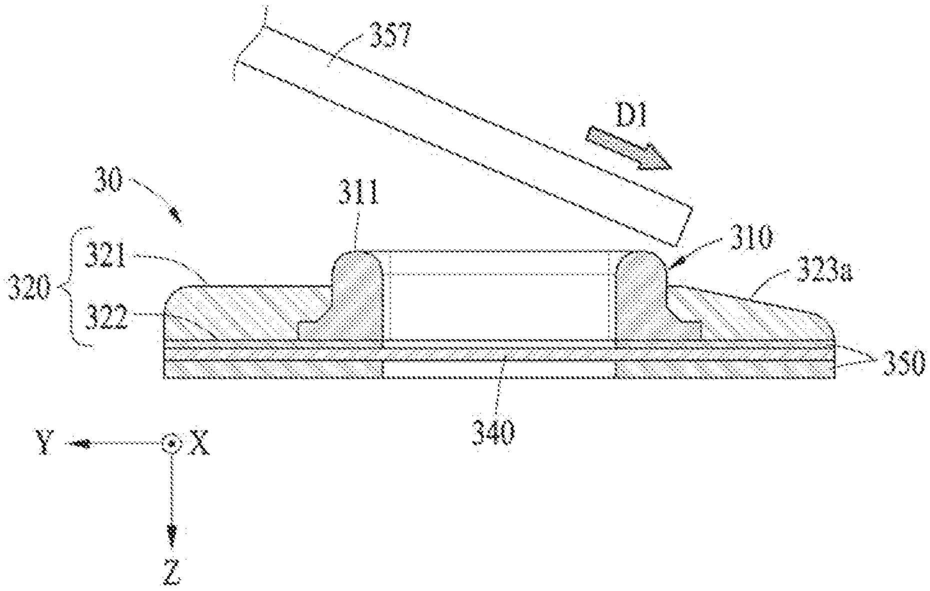
FIG. 7B schematically illustrates a function of a sound component assembly including an inclined recessed area according to an example embodiment.
Figure 7C:
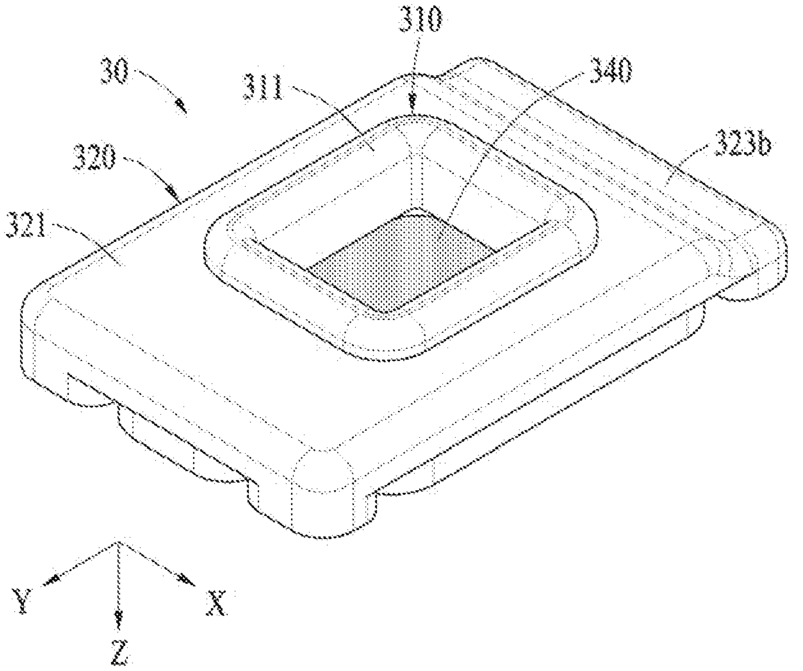
FIG. 7C is a plan view of a sound component assembly including a stepped recessed area according to an example embodiment.
Figure 7D:
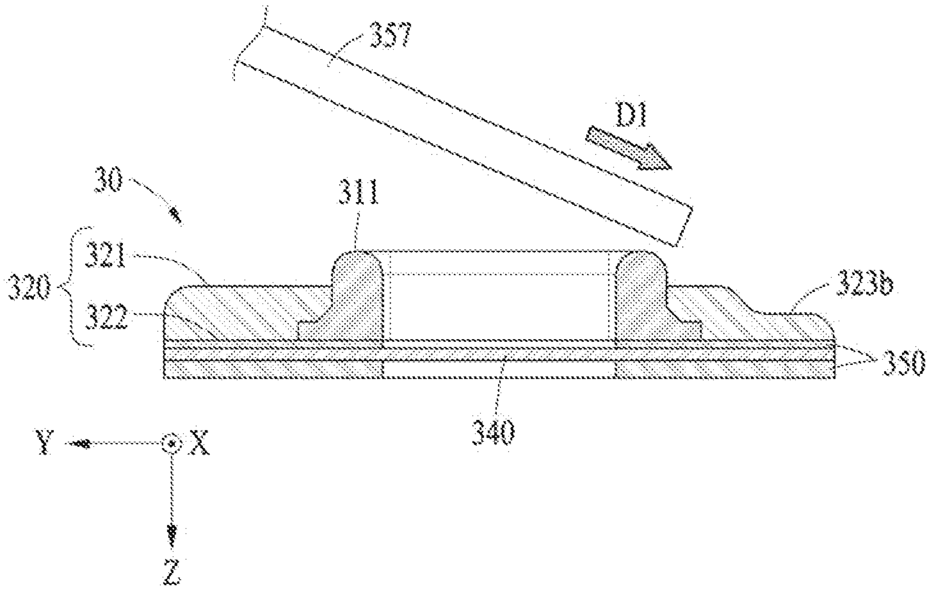
FIG. 7D schematically illustrates a function of a sound component assembly including a stepped recessed area according to an example embodiment.

FIG. 7A is a plan view of the sound component assembly 30 including an inclined recessed area 323*a* according to an example embodiment, FIG. 7B schematically illustrates a function of the sound component assembly 30 including the inclined recessed area 323*a* according to an example embodiment, FIG. 7C is a plan view of the sound component assembly 30 including a stepped recessed area 323*b* according to an example embodiment, and FIG. 7D schematically illustrates a function of the sound component assembly 30 including the stepped recessed area 323*b* according to an example embodiment.

Referring to FIGS. 7A and 7B, the cover portion 320 may include the inclined recessed area 323*a* formed on a surface facing the PCB 351. The inclined recessed area 323*a* may include an inclined surface formed from one point of the cover surface 321 to an edge of the cover surface 321.

For example, an inclination angle of the inclined surface of the inclined recessed area 323*a* may be greater than or equal to an angle between a third direction D1 in which the PCB 351 is assembled in the sliding manner and the base surface 322 of the cover portion 320.

As the inclined recessed area 323*a* is present, the PCB 351 may not excessively press the cover portion 320 and may be stably introduced in the third direction D1.

Referring to FIGS. 7C and 7D, the cover portion 320 may include a stepped recessed area 323*b* formed on a surface facing the PCB 351. The stepped recessed area 323*b* may include a stepped portion formed from one point of the cover surface 321 to an edge of the cover surface 321.

For example, an angle between a start point and an end point of the stepped recessed area 323*b* may be greater than or equal to an angle between a third direction D1 in which the PCB 351 is introduced in the sliding manner and the base surface 322 of the cover portion 320.

As the stepped recessed area 323*b* is present, the PCB 351 may not excessively press the cover portion 320 and be stably introduced in the third direction D1.

Figure 8A:
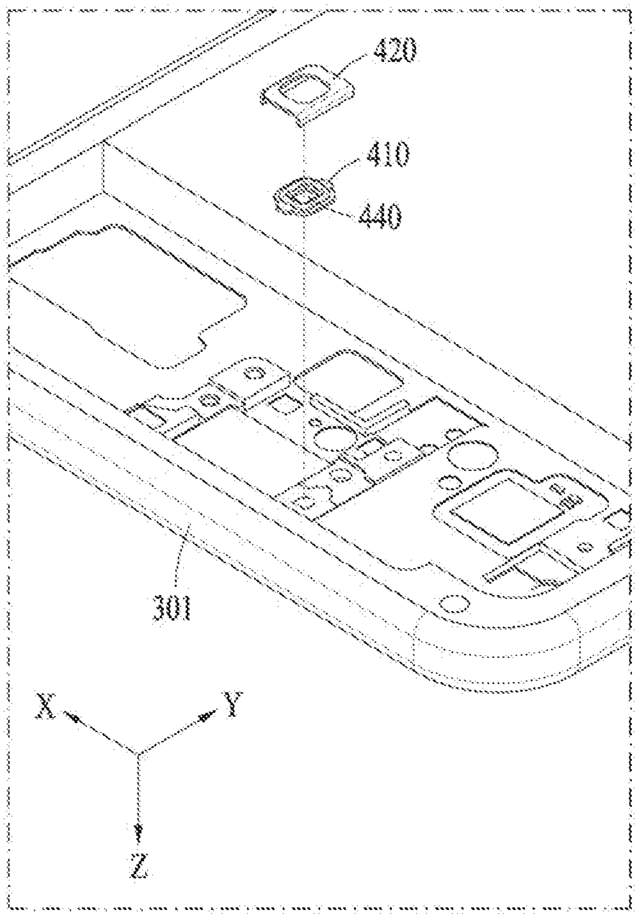
FIG. 8A illustrates a sound component assembly to be mounted in a housing of an electronic device according to an example embodiment.
Figure 8B:
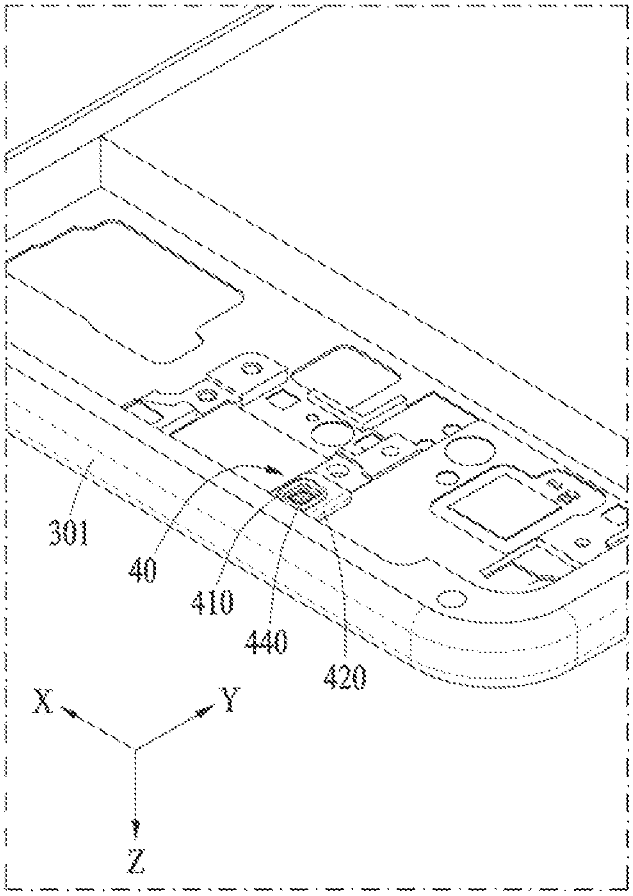
FIG. 8B illustrates the sound component assembly mounted in the housing of the electronic device according to an example embodiment.
Figure 8C:
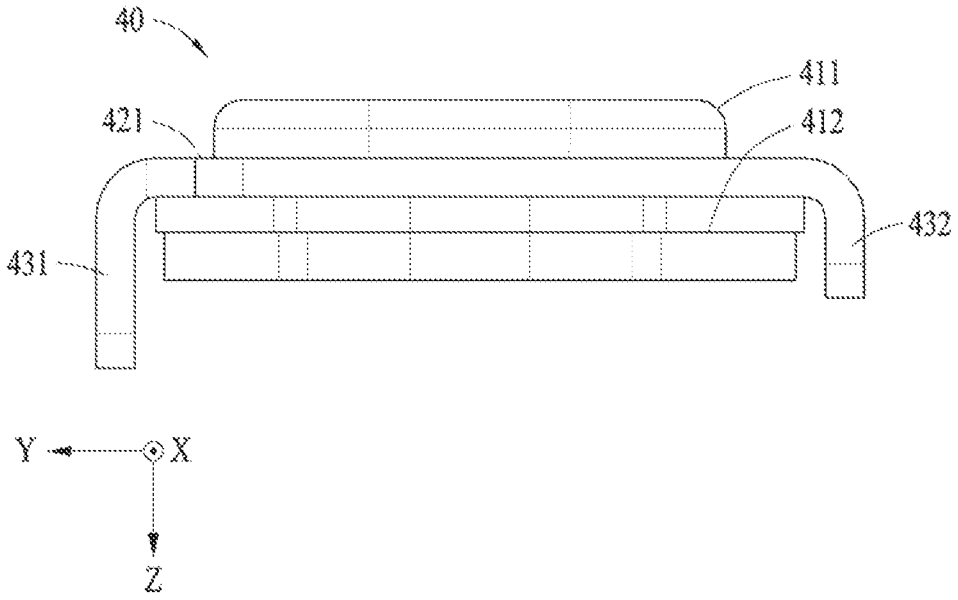
FIG. 8C is a front view of a sound component assembly according to an example embodiment.

FIG. 8A illustrates a sound component assembly 40 to be mounted in the housing 301 of the electronic device according to an example embodiment, and FIG. 8B illustrates the sound component assembly 40 mounted in the housing 301 of the electronic device according to an example embodiment. FIG. 8C is a front view of the sound component assembly 40 according to an example embodiment, and FIG. 8D is a cross-sectional view illustrating the sound component assembly 40 disposed in the electronic device according to an example embodiment.

Referring to FIGS. 8A to 8D, the sound component assembly 40 may include a sealing portion 410, a cover portion 420, and a mesh portion 440.

Figure 8D:
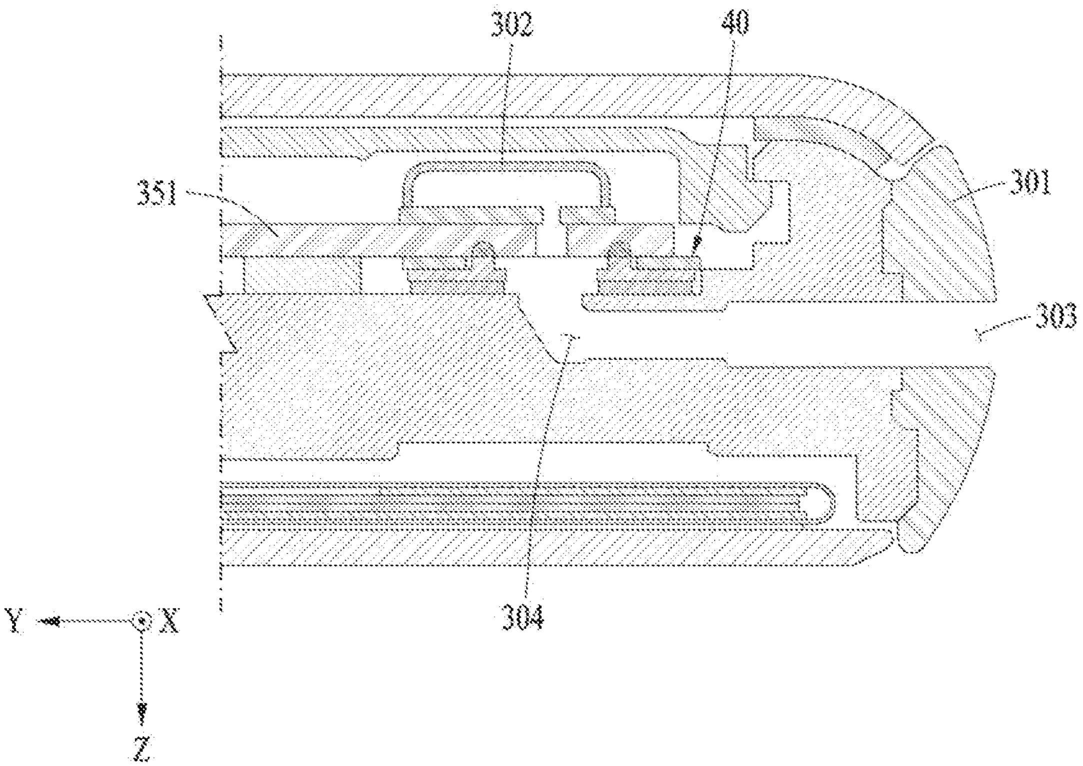
FIG. 8D is a cross-sectional view illustrating a sound component assembly disposed in a housing of an electronic device according to an example embodiment.

In an example embodiment, the sealing portion 410 may include a protruding area 411, and the protruding area 411 may protrude in a first direction (e.g., a −Z direction in FIGS. 8C and 8D) from the outside of an internal cavity toward the sound module 302 while forming the internal cavity that communicates with a sound passage 304 (e.g., the sound passage 304 of FIG. 8D). The sealing portion 410 may include a base area 412 on an opposite side (e.g., an area of the sealing portion 410 facing +Z in FIGS. 8C and 8D) of the protruding area 411. For example, the sealing portion 410 may be disposed in the housing 301 such that the protruding area 411 may be pressed on one surface of the PCB 351 (e.g., a surface of the PCB 351 facing the +Z direction in FIG. 8D) with the sound module 302 mounted thereon. The base area 412 of the sealing portion 410 may be formed to extend from the protruding area 411 in a direction of the outer side of the internal cavity (e.g., a ±Y direction in FIGS. 8C and 8D), such that the base area 412 may have a larger area than the protruding area 411, based on a state in which the protruding area 411 and the base area 412 are viewed in a second direction (e.g., the +Z direction in FIGS. 8C and 8D).

In an example embodiment, the cover portion 420 may include a cover member 421, and the cover member 421 may cover the base area 412 while accommodating the protruding area 411. The cover member 421 may be formed separately from the sealing portion 410, and the cover member 421 may be seated on the sealing portion 410 after the sealing portion 410 is disposed in position in the housing 301, or the sealing portion 410 may be disposed in position in the housing 301 in a state in which the cover member 421 is seated on the sealing portion 410. A thickness of the cover member 421 may be less than a protrusion height of the protruding area 411 from one surface of the base area 412 (e.g., the surface of the base area 412 facing the PCB 351 in FIG. 8D). Thus, in a state in which the cover member 421 is seated on the base area 412 of the sealing portion 410, the protruding area 411 may protrude beyond the cover member 421 and form the sealing with the PCB 351.

In an example embodiment, the sealing portion 410 may be formed of a first material, and the cover member 421 may be formed of a second material having a greater hardness than the first material. For example, the first material may be rubber, and the second material may be plastic or metal.

Figure 9A:
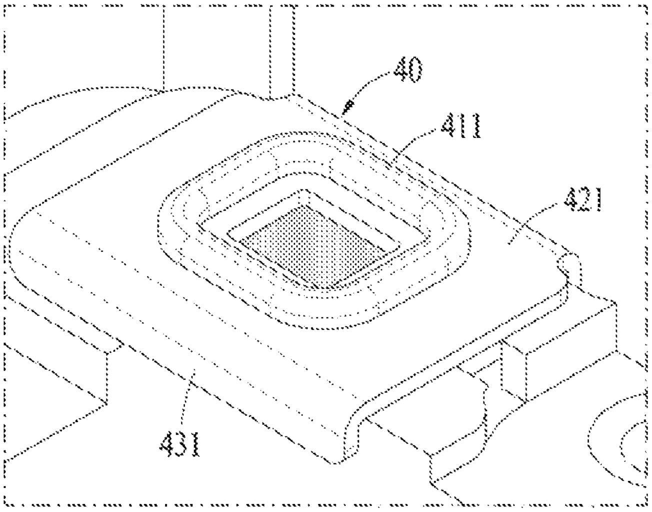
FIG. 9A is a perspective view of a sound component assembly viewed from one side according to an example embodiment.
Figure 9B:
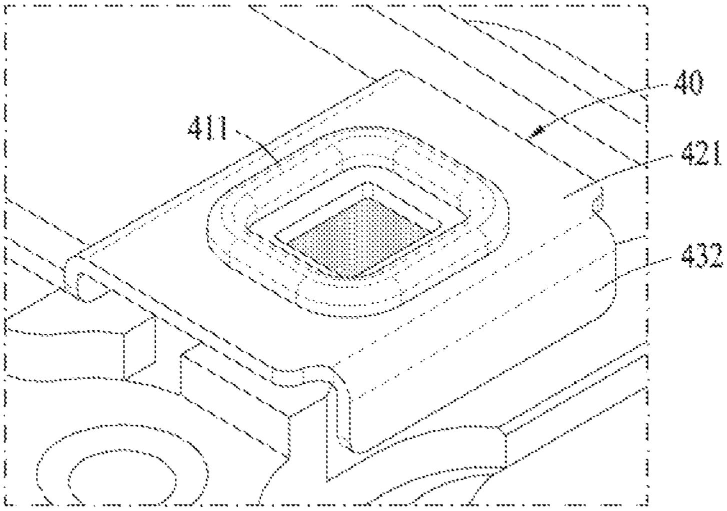
FIG. 9B is a perspective view of the sound component assembly viewed from the other side according to an example embodiment.

FIG. 9A is a perspective view of the sound component assembly 40 viewed from one side according to an example embodiment, and FIG. 9B is a perspective view of the sound component assembly 40 viewed from an opposite side according to an example embodiment.

Referring to FIGS. 9A and 9B, the sound component assembly 40 may include a first support rib 431 and/or a second support rib 432 formed to protrude in a second direction (e.g., the +Z direction in FIGS. 8C and 8D).

In an example embodiment, the first support rib 431 may extend from one edge of the cover member 421 in the second direction (e.g., the +Z direction in FIGS. 8C and 8D) to support the cover member 421. The second support rib 432 may extend from another edge of the cover member 421 in the second direction to support the cover member 421. The first support rib 431 and the second support rib 432 may be supported to be in contact without pressing even when in contact with or not in contact with a surrounding structure in which the sealing portion 410 and the mesh portion 440 are placed, such that even when the cover member 421 is pressed by the PCB 351, the first support rib 431 and the second support rib 432 may prevent the cover member 421 from being excessively pressed. For example, the first support rib 431 or the second support rib 432 may be formed by bending an edge of the cover member 421 in a press manner.

According to various example embodiments, an electronic device 300 may include: a housing 301 including a sound hole 303 that is connected to a sound passage 304 within the housing; a PCB 351 in the housing 301; a sound module 302 on the PCB 351 in the housing 301, and adjacent to the sound hole 303, the sound module 302 including a speaker or a receiver that is configured to emit or receive a sound through the sound passage 304 connected to the sound hole 303; and a sound component assembly (e.g. the sound component assembly 30 or the sound component assembly 40) positioned between the sound hole 303 and the sound module 302 and surrounding at least a portion of the sound passage 304, wherein the sound component assembly may include: a sealing portion 310 that surrounds the sound passage 304 and that includes an internal cavity 313 therein that communicates with the sound passage 304, the sound passage 304 sealed by the sealing portion 310 by a first side of the sealing portion 310 contacting at least a portion of the PCB 351; a mesh portion 340 that traverses the sound passage 304 and contacts a second side of the sealing portion 310, opposite to the first side of the sealing portion 310, and the mesh portion 340 is configured to block foreign material from passing therethrough; and a cover portion 320 that faces the PCB 351 and covers a portion of the sealing portion 310 or a portion of the mesh portion 340. The cover portion 320 may have a greater hardness than the sealing portion 310.

In various example embodiments, the sealing portion 310 and the cover portion 320 may be integrally formed, or the sealing portion 310 and the cover portion 320 may be formed by double injection.

In various example embodiments, the sealing portion 310 may include: a protruding area 311 that includes the internal cavity 313 therein, the protruding area 311 protruding in a first direction toward the sound module 302 and surrounding the sound passage 304; and a base area 312 contacting the mesh portion 340 on a side of the protruding area 311 towards a second direction that is opposite to the first direction. The cover portion 320 may include: a cover surface 321 surrounding the protruding area 311 and facing the PCB 351 in the first direction; and a base surface 322 surrounding the base area 312 and formed on a side of the cover portion 320 towards the second direction, and wherein the protruding area 311 may protrude in the first direction past the cover surface 321.

In various example embodiments, a surface of the base area 312, that faces in the second direction, and the base surface 322 may be formed on a same plane.

In various example embodiments, in a view in which the protruding area 311 and the base area 312 are viewed in the second direction opposite to the first direction, an area of the base area 312 is larger than an area of the protruding area 311, and the cover surface 321 may cover at least a portion of the base area 312.

In various example embodiments, the sound component assembly 30 may further include a support 330 protruding from the base surface 322 in the second direction.

In various example embodiments, the support 330 may include a plurality of support members (e.g., a first support member 331, a second support member 332, a third support member 333, and a fourth support member 334) protruding from edges of the cover portion 320, wherein the support members may protrude a same distance as each other from the cover portion 320.

In various example embodiments, the cover portion 320 may include a stepped recessed area **323*b* formed on a surface of the cover portion 320 that faces the PCB 351, wherein the stepped recessed area 323*b* may have a stepped shape from one point of the cover portion 320, spaced apart from the sealing portion 310, to an edge of the cover portion 320**.

In various example embodiments, the cover portion 320 may include an inclined recessed area **323*a* formed on a surface of the cover portion 320 that faces the PCB 351, wherein the inclined recessed area 323*a* may include an inclined surface formed from one point of the cover portion 320 to an edge of the cover portion 320**.

In various example embodiments, the sealing portion 410 of the sound component assembly 40 may include: a protruding area 411 that includes the internal cavity 313 therein, the protruding area 411 protruding in a first direction toward the sound module 302 and surrounding the sound passage 304; and a base area 412 on a side of the protruding area 411 towards a second direction that is opposite to the first direction, wherein, in a view in which the protruding area 411 and the base area 412 are viewed in the second direction opposite to the first direction, an area of the base area 412 may be larger than an area of the protruding area 411. The cover portion 420 of the sound component assembly 40 may include a cover member 421 including opening that accommodate the protruding area 411, the cover member 421 covering at least a portion of the base area 412, wherein the cover member 421 may be formed separately from the sealing portion 410.

In various example embodiments, the cover portion 420 may further include: a support rib (e.g., a first support rib 431 and/or a second support rib 432) extending from an edge of the cover member 421 in the second direction opposite the first direction and supports the cover member 421.

According to various example embodiments, a sound component assembly 30 may include: a sealing portion 310 contacting at least a portion of a PCB 351 having a sound module 302 mounted thereon; and a cover portion 320 that faces the PCB 351 and covers the sealing portion 310, wherein the sealing portion 310 may be include a first material, the cover portion 320 may include a second material, and the second material may have a greater hardness than a hardness of the first material.

In various example embodiments, the cover portion 320 may include a plurality of support members (e.g., a first support member 331, a second support member 332, a third support member 333, and a fourth support member 334) protruding toward the sound hole 303.

In various example embodiments, the sealing portion 310 and the cover portion 320 may be integrally formed by double injection.

In various example embodiments, the cover portion 320 may include a recessed area (e.g., an inclined recessed area **323*a* and/or a stepped recessed area 323*b*) formed on a surface of the cover portion 320 that faces the PCB 351, wherein the recessed area may be positioned at an edge of the cover portion 320**.

In various example embodiments, the sealing portion 310 may include: a protruding area 311 contacting the PCB 351 and protruding in a first direction toward the sound module 302; and a base area 312 on a side of the protruding area 311 towards a second direction that is opposite to the first direction, wherein, in a view in which the protruding area and the base area are viewed in the second direction opposite to the first direction, an area of the base area 312 may be larger than an area of the protruding area 311.

In various example embodiments, the cover portion 420 may include a cover member 421 that covers at least a portion of the sealing portion 410 that faces towards the sound module 302, wherein the cover member 421 may be formed separately from the sealing portion 410 and may be seated on the sealing portion 410, and a thickness of the cover member 421 may be less than a protrusion height of the protruding area 411 from one surface of the base area 412.

In various example embodiments, the cover portion 420 may further include a support rib (e.g., a first support rib 431 and/or a second support rib 432) bent from an edge of the cover member 421 in direction away from the sound module 302.

According to various example embodiments, an electronic device 300 may include: a housing 301 that includes a sound hole 303 therein that is connected to a sound passage 304 within the housing; a PCB 351 in the housing 301; a sound module 302 mounted in the housing 301 so as to be adjacent to the sound hole 303, a sound module 302 on the PCB 351 in the housing 301, and adjacent to the sound hole 303, the sound module 302 including a speaker or a receiver configured to emit or receive a sound through the sound passage 304 connected to the sound hole 303; and a sealing portion 310 that surrounds the sound passage 304 and includes an internal cavity 313. The sealing portion 310 may further include: a protruding area 311 protruding in a first direction toward the sound module 302 to contact a portion of the PCB 351; and a base area 312 contacting the protruding area 311 and extending in a third direction orthogonal to the first direction, the sound passage 304 sealed by the sealing portion 310 by one side of the protruding area 311 contacting the PCB 351. The electronic device 300 may further include: a mesh portion 340 including a mesh that traverses the sound passage 304 while contacting the base area 312; and a cover portion 320 that covers at least a portion of the sealing portion 310 or a portion of the mesh portion 340, the cover portion 320 having a greater hardness than a hardness of the sealing portion 310, wherein, in a view in which the mesh portion 340 and the sealing portion 310 are viewed from the PCB 351, a remaining portion of the mesh portion 340 excluding a portion corresponding to the internal cavity 313 and a remaining portion of the sealing portion 310 excluding the protruding area 311 may not be exposed by being covered by the cover portion 320.

What is claimed is:

1. An electronic device, comprising:

a housing comprising a sound hole that is connected to a sound passage within the housing;

a printed circuit board (PCB) in the housing;

a sound module on the PCB in the housing, and adjacent to the sound hole, the sound module comprising a speaker or a receiver that is configured to emit or receive a sound through the sound passage connected to the sound hole; and a sound component assembly positioned between the sound hole and the sound module, and surrounding at least a portion of the sound passage, wherein the sound component assembly comprises:

a sealing portion that surrounds the sound passage and that comprises an internal cavity therein that communicates with the sound passage, the sound passage sealed by the sealing portion by a first side of the sealing portion contacting at least a portion of the PCB;

a mesh portion that traverses the sound passage and contacts a second side of the sealing portion, opposite to the first side of the sealing portion, and the mesh portion is configured to block foreign material from passing therethrough; and a cover portion that faces the PCB and covers a portion of the sealing portion or a portion of the mesh portion.

2. The electronic device of claim 1, wherein the cover portion has a greater hardness than a hardness of the sealing portion.

3. The electronic device of claim 1, wherein the sealing portion and the cover portion are integrally formed.

4. The electronic device of claim 1, wherein the sealing portion and the cover portion are formed by double injection.

5. The electronic device of claim 1, wherein the sealing portion comprises:

a protruding area that comprises the internal cavity therein, the protruding area protruding in a first direction toward the sound module and surrounding the sound passage; and a base area contacting the mesh portion on a side of the protruding area towards a second direction that is opposite to the first direction, wherein the cover portion comprises:

a cover surface surrounding the protruding area and facing the PCB in the first direction; and a base surface surrounding the base area and formed on a side of the cover portion towards the second direction, and wherein the protruding area protrudes in the first direction past the cover surface.

6. The electronic device of claim 5, wherein a surface of the base area, that faces in the second direction, and the base surface are formed on a same plane.

7. The electronic device of claim 5, wherein, in a view in which the protruding area and the base area are viewed in the second direction opposite to the first direction, an area of the base area is larger than an area of the protruding area, and the cover surface covers at least a portion of the base area.

8. The electronic device of claim 1, further comprising:

a support protruding from the cover portion in a direction away from the sound module.

9. The electronic device of claim 8, wherein the support comprises support members protruding from edges of the cover portion, and wherein the support members protrude a same distance as each other from the cover portion.

10. The electronic device of claim 1, wherein the cover portion comprises a recessed area formed on a surface of the cover portion that faces the PCB, and wherein the recessed area has a stepped shape from one point of the cover portion, spaced apart from the sealing portion, to an edge of the cover portion.

11. The electronic device of claim 1, wherein the cover portion comprises a recessed area formed on a surface of the cover portion that faces the PCB, and wherein the recessed area comprises an inclined surface formed from one point of the cover portion to an edge of the cover portion.

12. The electronic device of claim 1, wherein the sealing portion comprises:

a protruding area that comprises the internal cavity therein, the protruding area protruding in a first direction toward the sound module and surrounding the sound passage; and a base area on a side of the protruding area towards a second direction that is opposite to the first direction, wherein, in a view in which the protruding area and the base area are viewed in the second direction opposite to the first direction, an area of the base area is larger than an area of the protruding area, wherein the cover portion comprises a cover member comprising an opening that accommodates the protruding area, the cover member covering at least a portion of the base area, and wherein the cover member is formed separately from the sealing portion.

13. The electronic device of claim 12, wherein the cover portion further comprises:

a support rib extending from an edge of the cover member in the second direction opposite to the first direction, and supports the cover member.

14. A sound component assembly for an electronic device, the sound component assembly comprising:

a sealing portion contacting at least a portion of a printed circuit board (PCB) having a sound module mounted thereon; and a cover portion that faces the PCB and covers the sealing portion, wherein the sealing portion comprises a first material, the cover portion comprises a second material, and the second material has a greater hardness than the first material, and wherein the sealing portion further comprises: a protruding area contacting the PCB and protruding in a first direction toward the sound module; and a base area on a side of the protruding area towards a second direction that is opposite to the first direction.

15. The sound component assembly of claim 14, wherein the cover portion comprises a support member protruding in a direction away from the sound module.

16. The sound component assembly of claim 14, wherein the sealing portion and the cover portion are integrally formed by double injection.

17. The sound component assembly of claim 14, wherein the cover portion comprises a recessed area formed on a surface of the cover portion that faces the PCB, and wherein the recessed area is at an edge of the cover portion.

18. The sound component assembly of claim 14, wherein, in a view in which the protruding area and the base area are viewed in the second direction opposite to the first direction, an area of the base area is larger than an area of the protruding area.

19. The sound component assembly of claim 18, wherein the cover portion comprises a cover member that covers at least a portion of the sealing portion that faces towards the sound module, wherein the cover member is formed separately from the sealing portion, and wherein a thickness of the cover member is less than a protrusion height of the protruding area from one surface of the base area.

20. The sound component assembly of claim 19, wherein the cover portion further comprises a support rib bent from an edge of the cover member in a direction away from the sound module.

* * * * *